United States Patent
Youngworth

(10) Patent No.: US 9,817,721 B1
(45) Date of Patent: Nov. 14, 2017

(54) HIGH AVAILABILITY MANAGEMENT TECHNIQUES FOR CLUSTER RESOURCES

(71) Applicant: Sanmina Corporation, San Jose, CA (US)

(72) Inventor: Chris Youngworth, San Jose, CA (US)

(73) Assignee: Sanmina Corporation, San Jose, CA (US)

( * ) Notice: Subject to any disclaimer, the term of this patent is extended or adjusted under 35 U.S.C. 154(b) by 350 days.

(21) Appl. No.: 14/552,376

(22) Filed: Nov. 24, 2014

Related U.S. Application Data

(63) Continuation of application No. 14/213,559, filed on Mar. 14, 2014, now abandoned.

(51) Int. Cl.
  *G06F 11/00*  (2006.01)
  *G06F 11/14*  (2006.01)
  *G06F 11/30*  (2006.01)
  *G06F 11/34*  (2006.01)

(52) U.S. Cl.
  CPC ...... *G06F 11/1412* (2013.01); *G06F 11/3006* (2013.01); *G06F 11/3409* (2013.01)

(58) Field of Classification Search
  CPC .................................................. G06F 11/1412
  See application file for complete search history.

(56) References Cited

U.S. PATENT DOCUMENTS

| | | | | |
|---|---|---|---|---|
| 7,634,683 B2 * | 12/2009 | De La Cruz | ........ | G06F 11/2025 714/11 |
| 7,814,273 B2 * | 10/2010 | Barrall | ................. | G06F 3/0607 711/114 |
| 7,822,862 B2 * | 10/2010 | Slater | ................. | G06F 11/3433 709/203 |
| 7,861,106 B2 * | 12/2010 | Avizienis | ............ | G06F 11/0793 714/2 |
| 8,700,611 B2 * | 4/2014 | Kelshikar | ......... | G06F 17/30545 707/722 |
| 8,743,680 B2 * | 6/2014 | Brown | ................ | H04L 41/0659 370/218 |
| 9,244,796 B2 * | 1/2016 | Griffith | ............... | G06F 11/3006 |
| 2002/0178396 A1 * | 11/2002 | Wong | .................. | G06F 11/0709 714/4.11 |
| 2006/0259619 A1 * | 11/2006 | Chang | ..................... | H04L 69/40 709/224 |

(Continued)

OTHER PUBLICATIONS

U.S. Appl. No. 14/213,559, filed Mar. 14, 2014, High Availability Management Techniques for Cluster Resources.

(Continued)

*Primary Examiner* — Christopher McCarthy
(74) *Attorney, Agent, or Firm* — Schwegman Lundberg & Woessner, P.A.

(57) ABSTRACT

The present disclosure describes methods and system configurations for failover of cluster computing system resources, for a cluster computing system including a plurality of cluster nodes. In some examples, operations are performed to monitor an abstracted resource and reconfigure the abstracted resource, to enable fail-over processing for component members of the abstracted resource. In further examples, a hierarchy of resource dependencies is defined to enable enhanced fail-over processing for the failure of abstracted resources that cause the failure of services within the cluster computing system that are dependent upon the abstracted resources.

22 Claims, 11 Drawing Sheets

(56) References Cited

U.S. PATENT DOCUMENTS

| | | | | |
|---|---|---|---|---|
| 2007/0067673 | A1* | 3/2007 | Avizienis | G06F 11/0793 714/12 |
| 2013/0039166 | A1* | 2/2013 | Brown | H04L 41/0659 370/216 |
| 2013/0058331 | A1* | 3/2013 | Thakkar | H04L 12/4633 370/389 |
| 2013/0212279 | A1* | 8/2013 | Dutta | G06F 9/5077 709/226 |
| 2013/0290957 | A1* | 10/2013 | Li | G06F 9/5066 718/1 |
| 2013/0326174 | A1* | 12/2013 | Tsirkin | G06F 9/45558 711/162 |
| 2015/0058843 | A1* | 2/2015 | Holler | G06F 9/455 718/1 |
| 2016/0085645 | A1* | 3/2016 | Buzzard | G06F 11/2017 714/6.21 |
| 2017/0024293 | A1* | 1/2017 | Bell | G06F 11/1438 |

OTHER PUBLICATIONS

"Red Hat Enterprise Linux 6 Cluster Administration—Configuring and Managing the High Availability Add-On", (c) 2013 Red Hat, Inc., (2013), 229 pgs.

"Red Hat Enterprise Linux 6 High Availability Add-On Overview—Overview of the High Availability Add-On for Red Hat Enterprise Linux Edition 6", (c) 2010 Red Hat, Inc., (2010), 39 pgs.

"Resource Agents From Linux-HA", [online]. [retrieved on Mar. 4, 2014]. Retrieved from the Internet: <URL: http://www.linux-ha.com/wiki/Resource_Agents>, (Oct. 27, 2011), 1-11.

Marowsky-Bree, L., "Open Clustering Framework Resource Agent API", [online]. [retrieved on Mar. 5, 2014]. Retrieved from the Internet: <URL: http://www.opencf.org/cgi-bin/viewcvs.cgi/specs/ra/resource-agent-api.txt?rev=HEAD&content-type=text/vnd.viewcvs-markup?, (C) 2002 Lars Marowsky-Bree, (2002), 1-9.

\* cited by examiner

```
                            CLUSTER.CONF

<resources>

<spd_switch node=nodeA switch=nodeA_switch1 />        ┐
         <spd_switch node=nodeB switch=nodeB_switch1 />        ├ 611
                                                                ┘
         <spd_switch_vhba name="VHBA1" primary_card="RC1:23,24"
       failover="RC2:27,28" ssds="a1,a2,a3" switch="a1" spare_pool="pool1"
       LUN="lun_1"/>                                             ┐
         <spd_switch_vhba name="VHBA2" primary_card="RC1:23,24"  ├ 612
       failover="RC2:27,28" ssds="b1,b2,b3" switch="b1" spare_pool="pool1"
       LUN="test_lun"/>                                          ┘

</resources>

<RT_switch>

<spd_rc name=RC1>
               <rc_switch_name=nodeA_switch1, output_ports=23,24,25,26/>   ┐
               <rc_switch_name=nodeB_switch1, output_ports=23,24,25,26/>   ├ 621
           </spd_rc>                                                        ┘

<spd_rc name=RC2>
               <rc_switch_name=nodeA_switch1, output_ports=27,28,29,30/>   ┐
               <rc_switch_name=nodeB_switch1, output_ports=27,28,29,30/>   ├ 622
           </spd_rc>                                                        ┘

<spd_rc name=RC3>
               <rc_switch_name=nodeA_switch1, output_ports=31,32,33,34/>   ┐
               <rc_switch_name=nodeB_switch1, output_ports=31,32,33,34/>   ├ 623
           </spd_rc>                                                        ┘

<spd_rc name=RC4>
               <rc_switch_name=nodeA_switch1, output_ports=35,36,37,38,39/> ┐
               <rc_switch_name=nodeB_switch1, output_ports=35,36,37,38,39/> ├ 624
           </spd_rc>                                                         ┘

</RT_switch>
```

600 (overall); 610 (resources block); 620 (RT_switch block)

*FIG. 6*

HIGH AVAILABILITY MANAGEMENT TECHNIQUES FOR CLUSTER RESOURCES

CLAIM OF PRIORITY

This Application is a Continuation Application of U.S. application Ser. No. 14/213,559, filed Mar. 14, 2014, the contents of which are hereby incorporated by reference in its entirety and the benefit of priority is claimed herein.

TECHNICAL FIELD

The present disclosure relates generally to cluster computing and more particularly to resources and services provided by computer clusters.

BACKGROUND

Computer systems may be arranged in a cluster. For example, a group of nodes may be arranged to provide distributed services such as storage, processing, and the like, on a high availability basis. Conventional use of cluster aware management however may prove awkward and incur unnecessary overhead when managing resource events and fail-over for elements that strictly exist within the context of a single node. Such is the case for many resources that are utilized in the support of a service that is exported from a node. The individual resources may have methods of recovery that allow a failure to be experienced and remedial action to be taken, all within the context of a single node.

In particular, conventional cluster management techniques for individual resources that are used by services are not well suited to resource handling within a single node of the cluster. Existing techniques do not properly define or describe the relationship between the multiple levels of resource abstraction often employed in an exported service. This deficiency limits many management capabilities for cluster administrators and users, and often results in a non-optimal response to failures.

BRIEF DESCRIPTION OF DRAWINGS

Some embodiments are illustrated by way of example and not limitation in the figures of the accompanying drawings.

FIG. 6 is a definition that illustrates a cluster configuration object used for a storage service implemented in a cluster computing system according to an example.

DETAILED DESCRIPTION

Example methods and systems are directed to cluster computer systems. The disclosed examples, many with reference to storage service configurations, merely typify possible variations and use cases of the example methods and systems. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Figure 1:
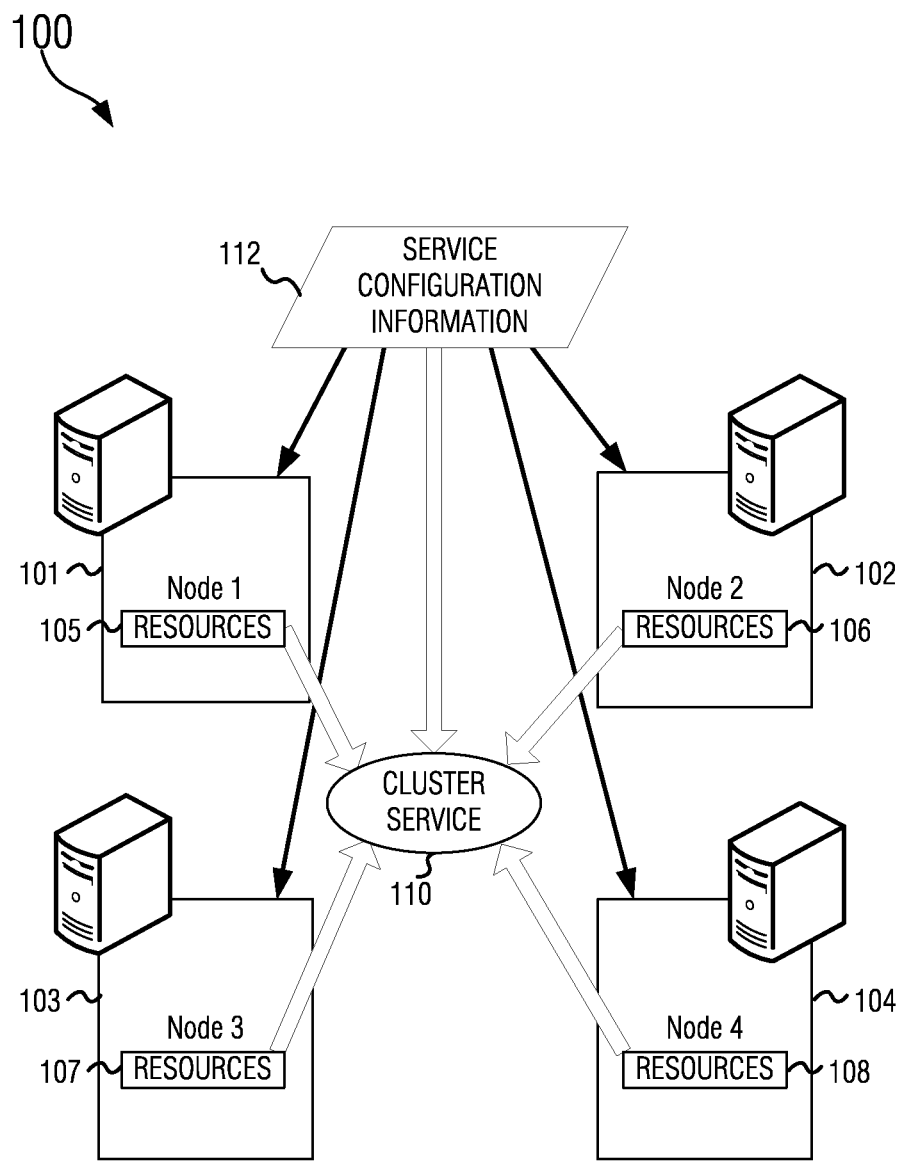
FIG. 1 is a diagram that illustrates an operation of a service in a cluster computing system according to an example.

FIG. 1 is a diagram that shows a cluster computing system 100 configured for operation of a service 110 according to one example. The cluster computing system 100 may provide for the operation and configuration of the service 110 as distributed among the cluster members, known as nodes. The cluster computing system 100 is illustrated as including four nodes, node 1 101, node 2 102, node 3 103, and node 4 104. Each of the four nodes may include similar or different collections of resources (resource sets) used to perform hardware and software operations of the service 110, with the resource sets being represented by resources 105 at node 1 101, resources 106 at node 2 102, resources 107 at node 3 103, and resources 108 at node 4 104. In some examples, the resources at the respective nodes may correlate to hardware and software elements operating in a physical chassis. In other examples, the resources may be shared among multiple nodes, such as by the use of common hardware elements shared among multiple nodes. Although the cluster computing system 100 is depicted as including four nodes, it will be understood that as few as two nodes may be operable in certain cluster computer system configurations.

The cluster computing system 100 is configured to provide the service 110 in connection with use of the resources at the respective nodes to perform cluster operations. These resources may include, for example, processing, memory, communication, and storage resources, through the operation of the resource sets 105, 106, 107, 108 at the respective nodes. As further described herein, the resource sets offered and utilized by the respective nodes may include discrete hardware elements, such as CPUs, switches, disks, and controllers, in addition to higher-level (e.g., logical) representations of the resources, such as a networking resource, a processing resource, a storage resource, and other abstractions of lower-level (e.g., physical) hardware and software resources.

The operation of the service 110 in the cluster computing system 100 is configured by use of service configuration information 112. This service configuration information 112 may be provided in the form of a cluster configuration object or file that is distributed among the various nodes of the cluster. The service configuration information 112 may be used to define redundancies for operation of the service within the cluster, such as to specify a primary node resource for operation of the service 110 (e.g., node 1 101), and a backup node resource for operation of the service 110 (e.g., node 2 102) for use in a fail-over scenario.

As further described in the following examples, the service configuration information 112 may also specify conditions and specifications of the resource sets 105, 106, 107, 108 that are used to facilitate the service 110. These conditions and specifications may designate a failover mechanism for an abstracted resource at a particular node, such as for an abstracted resource that provides a particular function, feature, or portion of the cluster service. The failover mechanism may cause the failure of abstracted resource to substitute a primary resource component with a backup resource component. The conditions and specifications of the abstracted resource, when included in the service configuration information 112, may be distributed among the nodes 101, 102, 103, 104 of the cluster to allow cluster-aware operations of abstracted resources and efficient resource failover among the same or different nodes of the cluster computing system 100.

In a specific example, the cluster computing system 100 may be configured as a storage cluster, to provide a file system across multiple nodes of the cluster computing system 100. A storage cluster in the cluster computing system 100 may be configured to provide for storage redundancy distributed across nodes, such as through the creation of RAID-based logical units (e.g., LUNs) that have legs in different failure domains. For example, a storage target in the storage cluster may be implemented with a mirrored RAID 1 and 10 array, and the legs of these mirrors may be configured to reside on different physical nodes of the cluster computing system 100. The target may be exported from either of the nodes that the RAID legs are present on. The duplication of data across storage media in different nodes allows a client of the storage cluster to continue to use an exported logical storage unit with a single surviving mirror leg, even if failure is experienced on one of the physical nodes. In the case of such a failure, the target is configured to be exported from the surviving node.

In a storage cluster, the service configuration information 112 may be used to transition operations of the storage cluster upon the failure of some portion of the storage service, including failure of an entire node for storage purposes. For example, if the target was exported on a failing node, the target can be re-exported on a surviving node, with the storage service performing a network fail-over to the alternate location (e.g., the surviving node). As further described herein, this service-level redundancy is enhanced through the use of resource-level redundancy for resources that the service is dependent upon.

The following techniques describe a configuration of a cluster computing system which includes nodes operating with enhanced failure detection and processing. In the same fashion that a hardware controller may be built with failure detection for some of its components allowing for an internal recovery that may be invisible to its software clients, a layer of management software can be interposed to provide detailed monitoring and recovery actions for redundant hardware within a single physical node. Such a management layer must have its resources abstracted such that it integrates with cluster level services, allowing local recovery to take place transparently, but invoking cluster level management for service fail-over when local recovery is either not possible or preferable.

Figure 2:
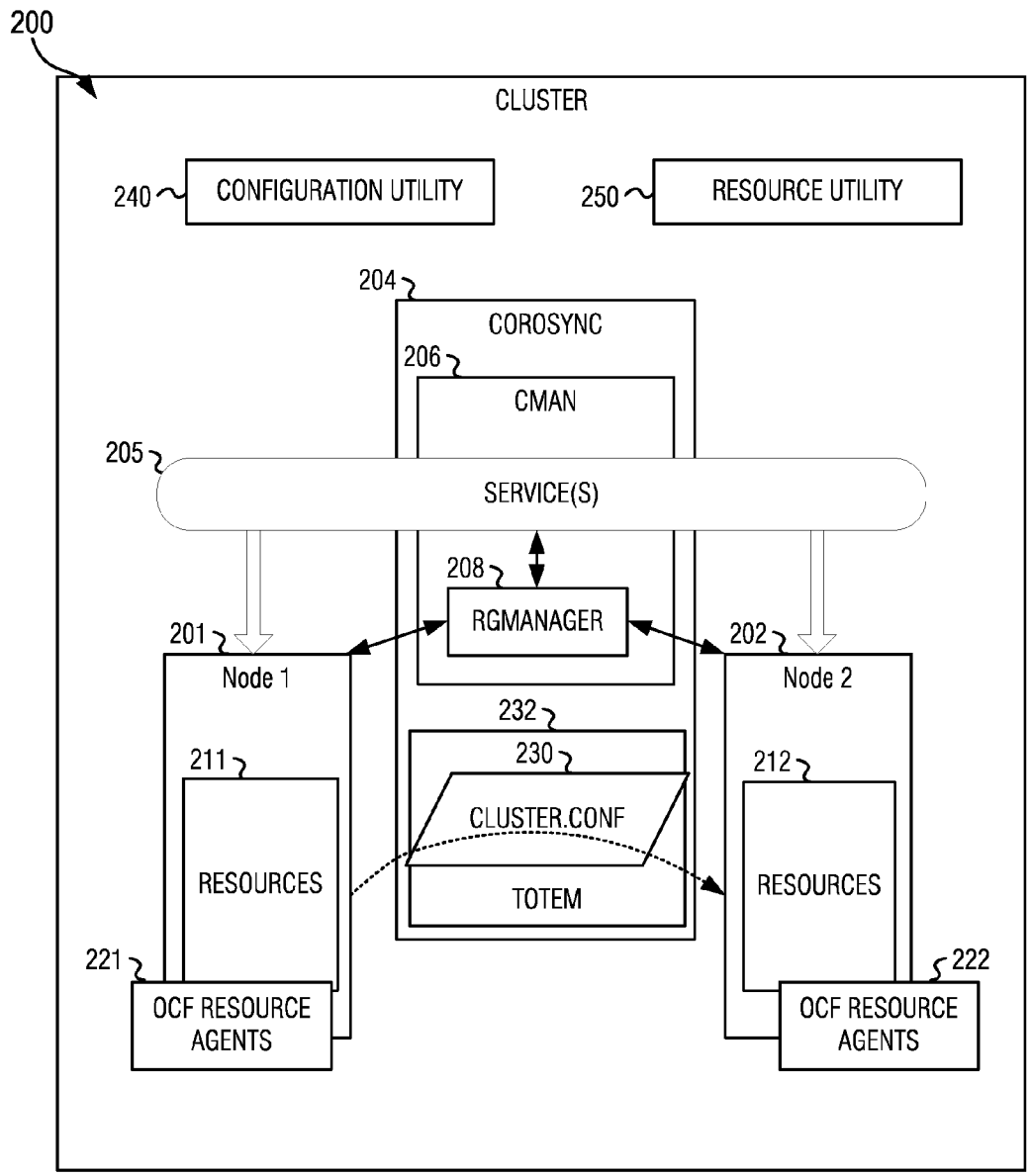
FIG. 2 is a diagram that illustrates an operation of cluster resources and services in a cluster computing system according to an example.

FIG. 2 provides an illustration of high availability (HA) resource monitoring in a computer system cluster configuration 200. This resource monitoring may be provided through the use of various depicted high-availability extensions (in the form of system processes, daemons, and like services). The high-availability extensions depicted in cluster configuration 200 are provided by the Red Hat High Availability (HA) Add-On for operation with the Red Hat Cluster Suite, a cluster-customized set of software components for use with a Red Hat Linux deployment. In other examples, resource monitoring may be provided in connection with other high-availability extensions and configurations. Thus, the particular Linux components described with FIG. 2 are provided for illustration purposes and are not intended as limitations for the HA resource monitoring abstraction and failover techniques described herein.

The cluster configuration 200 is depicted as including one or more services 205 configured for operation by cluster nodes, with operations by one or both of the node 1 201 and the node 2 202. The cluster nodes 201, 202 include respective sets of resources 211, 212 which represent the high- and low-level hardware and software components used to provide operations of the service. As further discussed herein, the application of abstractions and organization within the resources 211, 212 enables a granular approach to service operations, monitoring, and reconfiguration of a service in event of a runtime fault. Each abstracted resource in the set of resources 211, 212 is backed by a physical hardware resource or another abstracted resource, and many types of failure can be handled at the resource level without rising to the service level.

To implement fail-over handling and high availability processing for a cluster service at the service level of the nodes, a monitor is employed that utilizes a defined set of conditions and specifications for fail-over. In a cluster configuration hosting a Linux environment, one cluster monitor which may be used is the RGMANAGER component 208. The RGMANAGER component 208 operates as an availability manager that can restart an application process when it has failed, and operates to handle identified faults in the system including the loss of a node.

To implement fail-over handling, event handling, and high availability processing at the resource level of the nodes, agents may be used. The conditions and specifications for fail-over within the node itself may include failover conditions resulting from the abstraction of cluster-aware resources in the set of resources 211, 212. This abstraction may include registering the primary and secondary physical resources that the abstracted resources depend on, and monitoring the run-time state of these abstracted and physical resources with agents of the node. The monitoring may be based on a status trigger from a cluster aware management periodic query, a local periodic query, or may be informed by an asynchronous hardware signal. Such agents are further referred to as resource agents. The resource agents may operate to meet the specific hardware and configuration of the respective node.

In the cluster configuration 200, the resource agents configured to monitor the status of resources include Open Clustering Framework (OCF) resource agents 221, 222, which respectively monitor operations at resources within the set of resources 211, 212. On each node, an OCF resource agent (e.g., OCF resource agent 221 on Node 1 or OCF resource agent 222 on Node 2) operates to perform actions in the event of a failure of some underlying resource. The OCF resource agents 221, 222 may be configured to be compliant with the OCF specification. The OCF specification defines a standard resource agent API format that defines characteristics of a resource manager to invoke the resource agents. This standard API format may enable the pool of available resource agents to be shared and operated in a uniform fashion among different clustering solutions and configurations. An OCF resource agent may be configured to support actions including: start (start the resource); stop (stop the resource); monitor (monitor the health of a resource); and meta-data (provide information about the resource, and information about the parameters of resource instances handled by the agent).

The OCF resource agents 221, 222 may operate in addition to other resource agents provided in a Linux cluster framework such as the Red Hat HA Cluster Framework configuration. During operation of the cluster, the cluster configuration 200 monitors node health and resource agent instance health. The resource agents accordingly expose mechanisms to monitor physical hardware and the configuration of the individual resources (including abstracted resources as further described herein). When a failure occurs with some resource, a resource agent can attempt to perform failover from a failed resource component to a substitutable resource component. As needed, the resource agent can issue a start or stop to other agents for resources and services that are either dependent on, or dependencies of, the failing resource. These triggers, originating from the resource agent, are used by cluster agents to perform the appropriate response and reconfiguration. Should such reconfiguration include actions on more than one node, the cluster aware management facilities will be invoked, either directly through OCF starts and stops or indirectly through service fail-over.

In the cluster configuration 200, the cluster agents that are configured to perform a response to resource agent triggers include the RGMANAGER component 208. The RGMANAGER component 208 is configured to provide operability of respective services among nodes of the cluster. The RGMANAGER component 208 runs under the CMAN component 206, and provides failover capabilities for collections of resources that may be exposed through services or other node-based operations. In the event of a detected node failure or the return of failure on a status call for a service, the RGMANAGER component 208 can relocate the clustered service to another node with minimal service disruption. Thus, the RGMANAGER component 208 may be used to start (or restart) a service on a new node, such as transitioning the operation of the one or more services 205 from node 1 201 to node 2 202. The CMAN component 206, representing a "cluster manager", operates to maintain cluster operations such as cluster quorum, cluster membership, and handle communications between nodes in the cluster, including cluster operations to effect service failover.

The RGMANAGER component 208 allows administrators to define, configure, and monitor cluster services in a high-availability fashion. In the event of a node failure, or a service failure as determined through the OCF status call, the RGMANAGER component 208 can relocate the clustered service to another node with minimal service disruption. The RGMANAGER component 208 thus operates to enable services in the cluster to continue running, and launch failover actions and changes where appropriate. When a resource agent (e.g., OCF resource agents 221) determines that a dependent resource has failed it may choose to substitute a redundant resource to continue the service. If it cannot do this or chooses not to attempt a substitution, the resource agent indicates failure of the service on the associated OCF status call (e.g., indicating that resources 211 at node 1 201 has failed). The RGMANAGER component 208 is the entity that invokes the OCF status call. Upon receiving the failure status, the RGMANAGER component 208 can operate to restart or transition the service at the same or another node.

Node participation in the cluster may be established and managed through a totem facility, such as that provided from the COROSYNC component 204. For example, operations of nodes in the Red Hat HA Cluster Framework configuration are based on the COROSYNC totem ring protocol. A totem 232 may be used to communicate a cluster configuration object 230, such as a cluster.conf file, among the various nodes. Changes to the cluster configuration object 230 are sent around the cluster via a complete copy of the file in XML format, including changes to cluster.conf provided for abstracted resource definitions and conditions. Communications and cluster actions of the cluster configuration object 230 are gated in accordance with the possession of the totem. Thus, for a cluster.conf update to occur, the changes must move from node to node with the totem (e.g., from node 1 201 to node 2 202 with the totem 232).

This cluster configuration object 230 may include definitions for the abstracted resources and where they are to be moved in case of a failure. The cluster configuration object 230 thus may be used to precisely define failover domains and preferences for both resource and service failover within a node and across nodes. A failover domain for a service may be defined, for example, by an ordered subset of members to which a service may be bound. The failover domain for a service also may be structured to indicate the preferred characteristics of failover, including ordering between failover members, preferred members, and the like. Thus, failure of the service results in processing of the cluster configuration object 230 (e.g., cluster.conf) to determine which node to transition the resource.

Various configuration utilities and management utilities, including a configuration utility 240, and a resource utility 250, also may operate within the cluster configuration 200 to provide an interface to the resource and service management operations occurring within the cluster. For example, the configuration utility may invoke various resource utilities to instantiate a service from a hierarchy of instantiated physical and virtual resources. The attributes of the various resources and service may be such that the resource agents 221, 222 may be enjoined to provide the necessary status information and control feeds associated with the new service via the configuration utility 240 and the resource utility 250, enabling operation of a command line interface (CLI) or graphical user interface (GUI) for cluster resource management.

The tools traditionally provided by cluster configurations such as the Red Hat HA Cluster Framework distribution are not able to properly handle failure events occurring at lower levels of the resources in the cluster. For example, if a particular hardware component of a resource fails in a node, this failure will propagate throughout all dependencies of this component, leading to the service to fail on the node. Although the service may have a failover defined at another node, the failure will propagate up to the cluster level, and result in significant reconfiguration of the service and the cluster. The cluster level handling may have missed an opportunity to fail-over based on a redundancy in the first node's resources.

In existing cluster storage systems, for example, high availability is achieved through redundancy of nodes and physical resources wherever possible. However, the failure of any physical component on a storage or server chassis constitutes a failure of the resource that will often lead to failure of storage service operations on the entire node. Node and physical resource redundancy offers protection to the cluster from any single component failure, but provides a less-than-optimal approach for responding to multiple failures or failures of lower-level node resources that may provide a fallback resource. For example, a single RAID card failure on one chassis and a network card failure on the second chassis would leave at least parts of the storage system inoperable.

To introduce an enhanced level of high availability for operation of a clustered service, resource redundancy and failure processing can be introduced within a node with the use of abstracted resources. In the following storage examples, resource redundancy of the physical node is decomposed according to the configurational capabilities available to the software, through configurable resources such Serial Attached SCSI (SAS) switches and front end networking within the storage complex. From the use of these higher-level abstracted resources, lower-level and dependent resource elements of a cluster node can be substituted and used in failover scenarios.

As a first example used in a storage service, consider the abstraction of a networking resource. If there are two network cards in the chassis and a storage target can be moved from one network to the other, the network is deemed a configurable cluster resource where the first and second network cards are capable of serving as a primary or secondary resource respectively for that service. As a second example used in a storage service, consider the abstraction of a RAID controller resource. A first RAID controller may be substituted with a second RAID controller in a storage configuration where the storage devices are switchable from the first to the second RAID controller. Identifying and abstracting redundant elements within the node chassis that are used in a service and can be substituted allows the node to benefit from the natural redundancy available in multiple RAID cards, network cards, and disks when they are wired together via configurable switches.

For a simple service dependent on a single resource in a cluster, the reconfiguration process involves a substitution and failover. As an example, consider an IP address that may be present on more than one network port. A simple health check of the primary port and even a ping check can show whether the port is properly functioning. If the port is found to be not functioning, a script can be called to move the IP address from the failed port to the backup. Complexity is introduced into the resource fail-over mechanism based on two significant factors: The service may require substantial configuration action to move; and the service may depend on multiple resources and the function of the resources may be interdependent.

To address these factors, a cluster computer system may be configured to handle failover between substitutable resources through the definition and use of a resource hierarchy. From an implementation standpoint there is a natural hierarchy or tree structure that emerges from resource dependencies. The resource objects at the top (and in particular, the service at the top of the hierarchy) are dependent on the resources below. As an example, consider a storage scenario where an NFS server is exported on a network. The storage containing the file system may be composed of a volume made of multiple disks and the disks may be presented through multiple independent controller cards. Clearly the availability of the file system requires a working network to expose a file system and the file system is dependent on the proper function of the controller cards. Likewise, proper functioning of the controllers is dependent on the health of the underlying disks. In practical terms, it is necessary to monitor all of the identifiable elements that a service is dependent on. This can be done at the top of the hierarchy, e.g., by monitoring file system function, or may be done at separate levels within the hierarchy, e.g., by monitoring the physical health or virtual function of each identifiable object (resource element) of the hierarchy.

Figure 3:
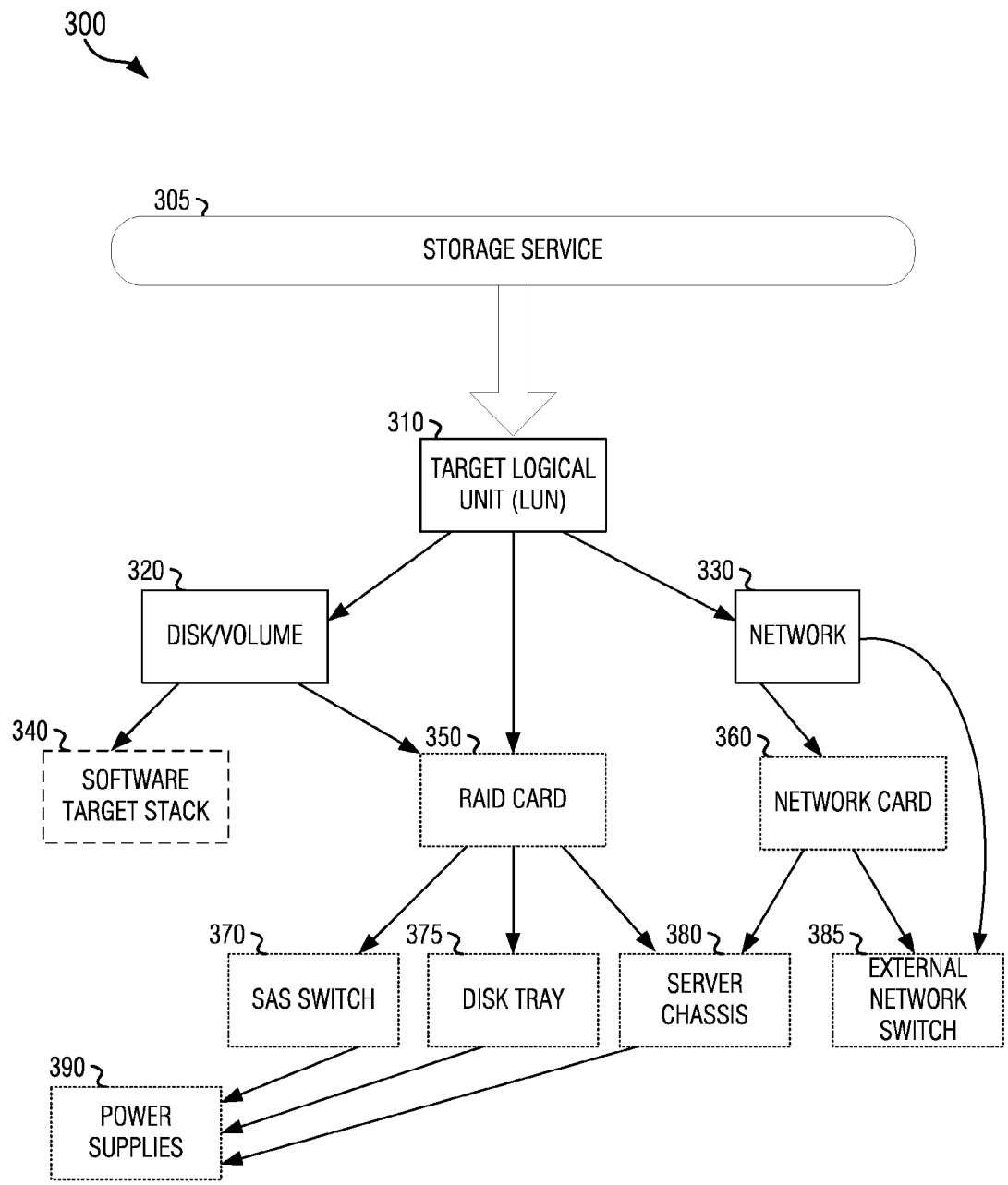
FIG. 3 is a diagram that illustrates a hierarchy of resources and resource dependencies for a storage service implemented in a cluster computing system according to an example.

FIG. 3 provides an illustration of a resource hierarchy 300 defined for a storage service 305 according to one example. This resource hierarchy 300 is illustrated to present a variety of resources and sub-resources that support dependencies of higher-level members. As further described, the resources in the resource hierarchy may represent abstracted (e.g., logical) resources, or may represent individual hardware (e.g., physical) resources. Thus, a resource in the resource hierarchy 300 may represent a virtualized resource with sets of characteristics that are constructed from software and hardware capabilities of the system.

As shown, the resource hierarchy 300 includes the dependency of a storage service 305 on a target logical unit (LUN) resource 310. The storage service 305 utilizes the target LUN resource 310 to store data at a particular logical unit. Thus, the target LUN resource 310 serves as a representation of the resource needed to store data in a particular volume within the cluster (which may include storage at one or multiple nodes of the cluster). A target LUN resource 310, however, depends on a number of lower level resources that may fail and be substituted without the loss of the resident node. Further, the failed resource may be specific to the target LUN resource 310. Other LUNs may be able to remain and function on the node, using other common resources that were shared with the target LUN resource 310 prior to the failure. Such complications make the simple parent-child hierarchy of the Red Hat HA Cluster Framework restrictive for complex cluster services.

As illustrated, the resource hierarchy 300 for the storage service 305 further includes the operational dependencies of the target LUN resource 310 upon a disk/volume resource 320, a network resource 330, and a RAID card resource 350. The disk/volume resource 320 may be further dependent on a software target stack 340 for proper operation, as well as the RAID card resource 350. The network resource 330 is further dependent on a network card resource 360 and an external network switch resource 385. Other levels of sub-dependencies are also formed with additional layers of the resource hierarchy 300, including dependency of the RAID card resource 350 on a SAS switch resource 370, a disk tray resource 375, a server chassis 380, and the external network switch 385 (with the SAS switch resource 370, the disk tray resource 375, and the server chassis resource 380 further depending on power supply resources 390).

The failure of lower-level components of the resource hierarchy 300 often may be resolved by substitution of resource elements. For example, the failure of a particular SAS expander/switch may cause loss of connection to some disk trays but not others, and the lost connection to a particular disk tray may be handled by substituting a backup expander or rebuilding RAIDs with disks from remaining disk trays. Thus, the substitution of a switch or the replacement of disks associated with the now unreachable from a surviving tray disk tray resource 375 may resolve the failure condition, without needing to propagate a failure to the higher levels of the target LUN resource 310 or the storage service 305.

Monitoring resources and implementing resource abstraction at multiple levels is thus useful when there are fail-over opportunities for individual resources within the hierarchy or tree. As another example, consider a failure of the RAID card resource 350 (e.g., a RAID controller). In this case, the target LUN resource 310 may be the first resource to notice the unavailability of the RAID card resource 350. After determining the nature of the failure, the target LUN resource 310 would call the lower level controller resource to see if a spare controller circuit is available. If no spare controller circuit is available, the target LUN resource 310 may fail over the file service to a secondary resource hierarchy with its own set of storage controllers and networks (e.g., a secondary resource hierarchy hosted by another node of the cluster).

In some cases, low-level resource monitoring may lead to changes that never rise to the top of the resource tree. RAID hot sparing for disk failure is an example of this. When a bad disk in the disk tray resource 375 in a mirrored RAID configuration is encountered, a spare drive may be substituted in the disk tray resource 375 and the contents of the old disk written to the spare drive, all without disturbing the upper portions of the service resource stack. This is an example of the utility of monitoring the lower level resources. If the problem cannot be handled at a leaf level in the resource tree, however, the fault is propagated up the resource tree until some resource unit can be substituted.

Figure 4:
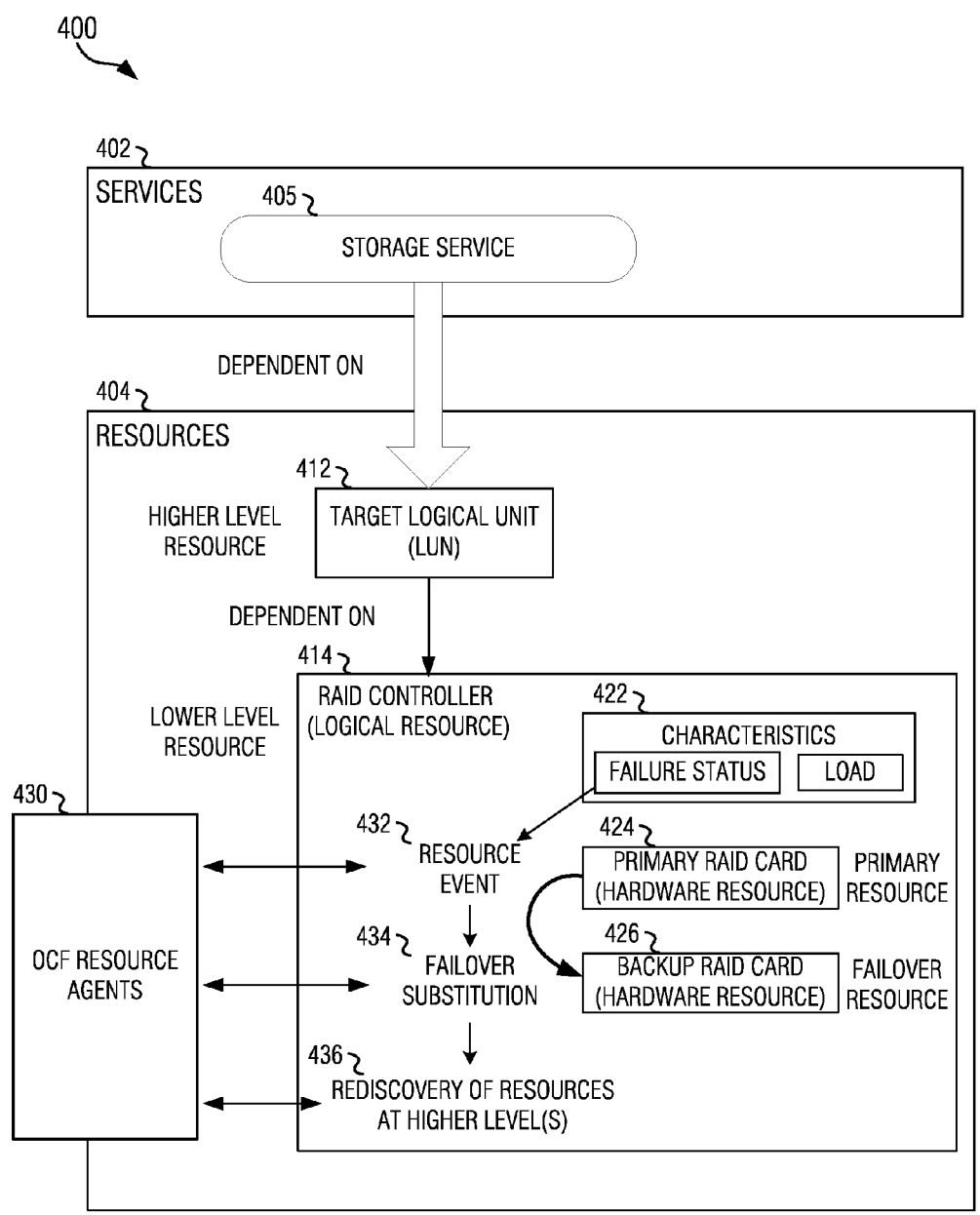
FIG. 4 is a diagram that illustrates characteristics and dependencies of abstracted resources in a hierarchy of resources for a storage service implemented in a cluster computing system according to an example.

FIG. 4 provides an illustration of a specific resource dependency 400 between a storage service and a subset of storage resources according to an example. As shown, the storage service 405 operates as one service in a plurality of services 402, with the operation of the storage service 405 being dependent on a plurality of resources 404. For simplicity, the only resources shown from the plurality of resources 404 are the target LUN resource 412 (a higher level resource), which in turn is dependent on a RAID controller resource 414 (a lower-level resource). It will be understood that other resource and resource elements, such as those depicted in FIG. 3, will also be applicable to the dependencies of the resource hierarchy.

The RAID controller resource 414 is an abstracted resource that represents the operation of a RAID card to perform storage operations within a particular node. Accordingly, the RAID controller resource 414 is represented by two physical resources: a primary RAID controller card 424 (a hardware resource, serving as the primary resource), and a backup RAID controller card 426 (a hardware resource, serving as the failover resource). The RAID controller resource 414 resource also includes a set of characteristics 422, providing a failure status and other information such as load.

The failure status indicated from the set of characteristics 422 can be detected and used to generate a failover resource event 432 by one or more OCF resource agents 430. (Other characteristics, such as load information may also be detected and used to generate another resource event). The failover resource event 432 can be used to initiate a resource failover by the OCF resource agents 430, such as to perform a failover substitution 434 of the hardware resource of the RAID controller 414 from the primary RAID controller card 424 to the backup RAID controller card 426. As a result of the failover substitution 434, the OCF resource agents 430 may perform a rediscovery of resources 436 at higher levels of the resource dependencies, to enable the reconfiguration of higher-level resources to utilize the substituted (failover) resource elements.

Identifying and abstracting the redundant elements within a cluster node's chassis that are used in a service (and can be substituted) allows the overall cluster operation to benefit from redundancy available in substitutable hardware elements. For example, in a storage service, multiple RAID cards, network cards, and disks may be substituted for one another when they are wired together via configurable switches (e.g., SAS switches). Thus, if a substitutable sub-resource (e.g., backup resource element) is available as a substitute for a failing resource, the failure of the resource can be remedied through a simple replacement of a resource element.

The reconfiguration of the particular resource to use another element, in some scenarios, may allow failover of the actual component at issue, rather than resulting in failover of an entire node. This resource substitution and resource failover with a RAID controller is illustrated in the storage cluster example of FIG. 5A. If a substitutable sub-resource is not available at the node for the failing resource, the failure of the resource can be remedied at a higher level resource in the resource dependency hierarchy, which may result in the failover of the service to another node and the reconfiguration of the service. This resource substitution and service failover from a RAID controller of a first node to a RAID controller of a second node is illustrated in the storage cluster example of FIG. 5B.

Figure 5A:
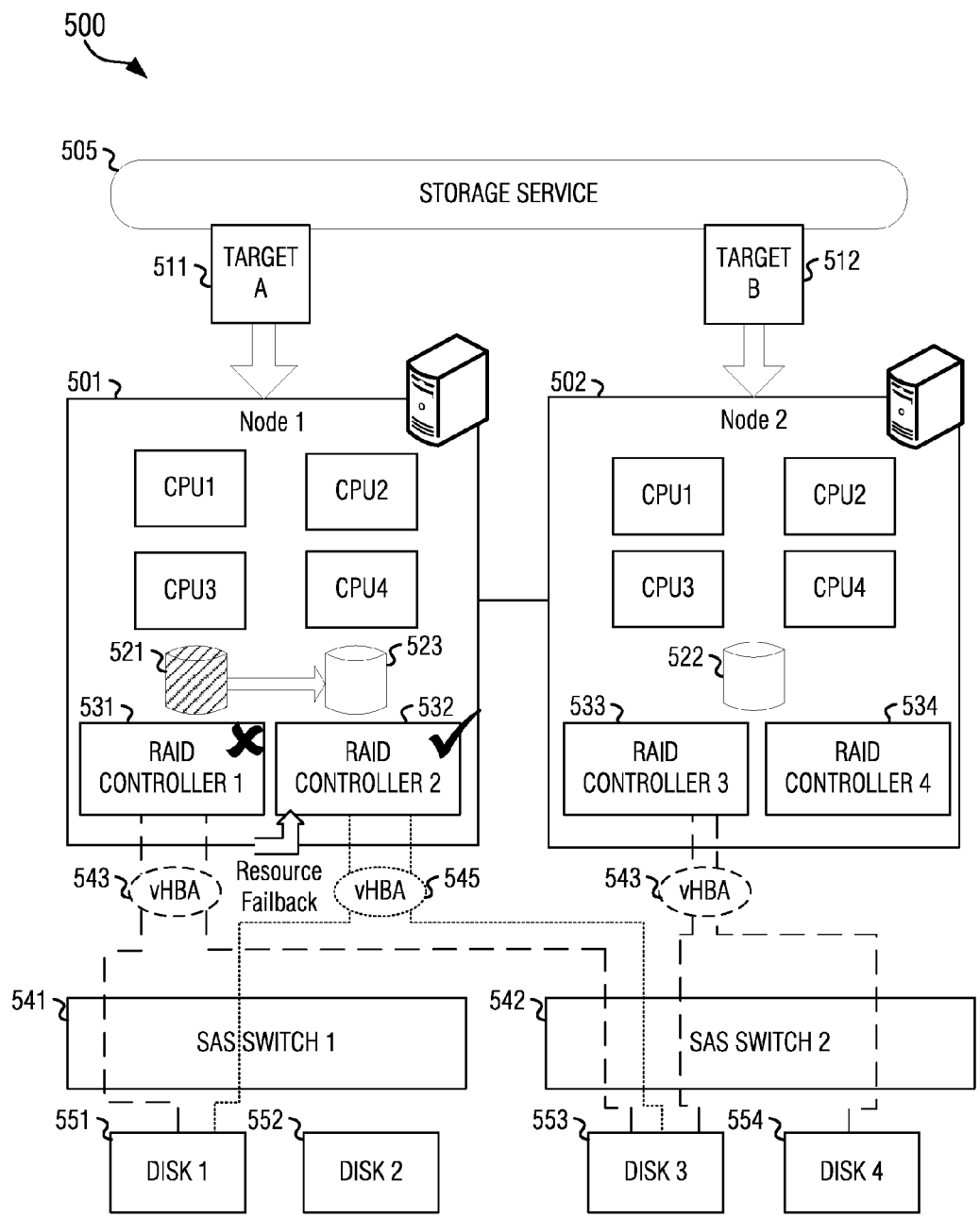
FIG. 5A is a diagram that illustrates resource failover between abstracted resources hosted in a single node for a storage service implemented in a cluster computing system according to an example.
Figure 5B:
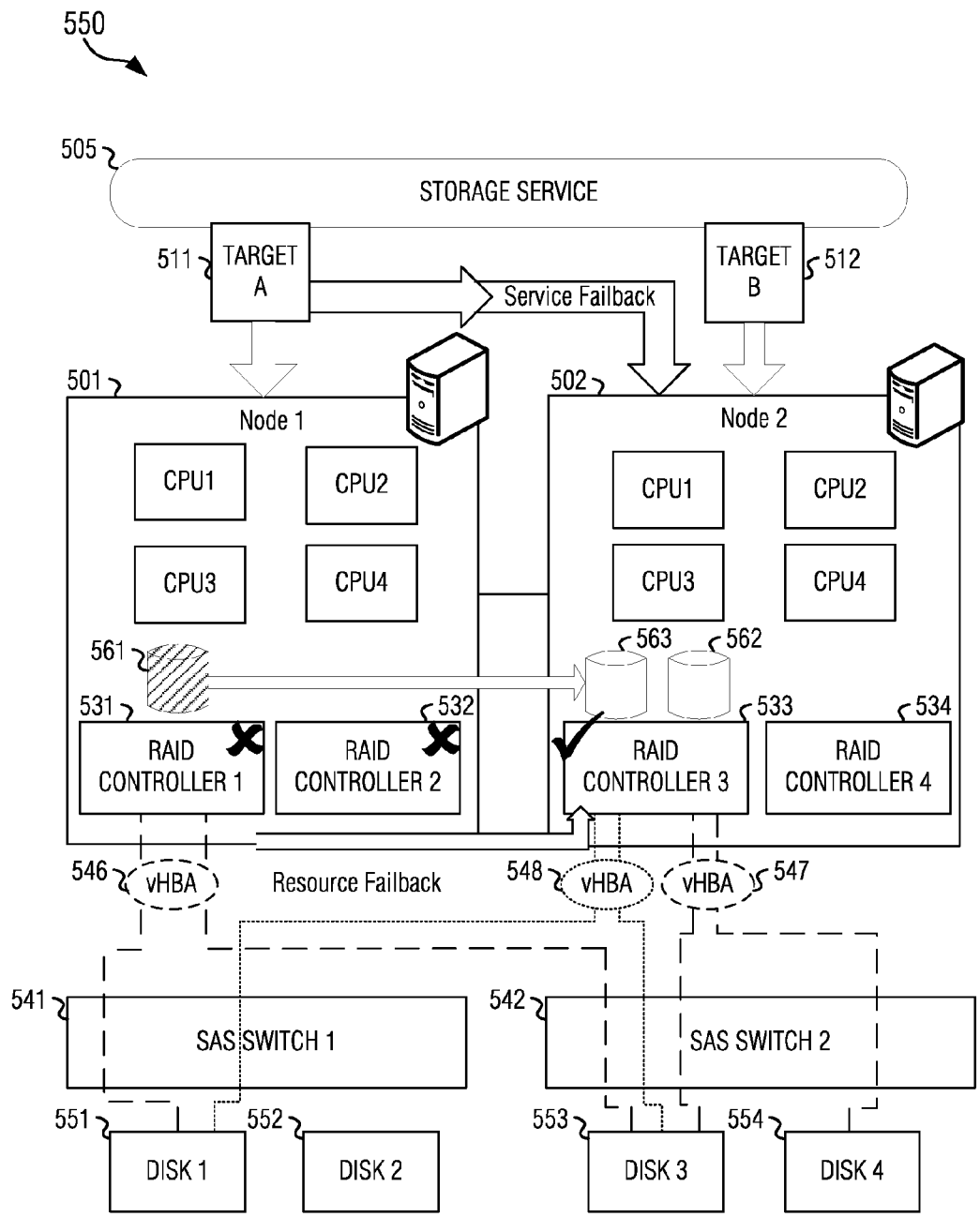
FIG. 5B is a diagram that illustrates resource failover between abstracted resources hosted in a separate nodes for a storage service implemented in a cluster computing system according to an example.

FIGS. 5A and 5B provide an illustration of a high availability failover of a storage service 505 in storage cluster configurations 500, 550 according to examples further described herein. For example, the storage cluster configurations 500, 550 may employ a Serial Attached SCSI (SAS)-switched network to provide the interconnection of multiple storage controllers from multiple nodes (e.g., node 1 501, node 2 502) to independent trays of SAS disks. The storage service 505 operates to export storage targets (Target A 511, Target B 512) for various logical storage units (e.g., LUNs) provided by the node (e.g., exported to an iSCSI target, or exported to an NFS resource for export as an NFS file system). In some examples, these the logical storage units will correspond to storage locations distributed across a plurality of nodes.

In the storage cluster configurations 500, 550, various SAS switches (SAS switch 541, SAS switch 542) provide access to drives providing data for the logical storage units (LUNs 521, 522, 523, 561, 562, 563) through a switchable behavior. The hardware resources, the disks (e.g., disk 1 551, disk 2 552, disk 3 553, disk 4 554) and the storage controllers (e.g., RAID controller 1 531, RAID controller 2 532, RAID controller 3 533, RAID controller 4 534), are connected through switches (e.g., SAS switch 1 541 or SAS switch 2 542) and each of the run time mappings between the disks and storage controllers cards defines the communication paths through these switches. The use of an SAS-based interconnect with the SAS switches enables the connection of any RAID controller, from any connected node, to any connected disk (e.g., any disk 551, 552, 553, 554 located on either node 501, 502 can be connected to any RAID controller 531, 532, 533, 534 by reconfiguration of the SAS switch 541, 542).

The use of multiple RAID controllers (RAID controller 1 531, RAID controller 532 on node 1 501, and RAID controller 3 533, RAID controller 534 on node 2) provides the advantage of enabling rerouting of disk/LUN export to another controller on the same node, or a different node, should one of these controllers fail. For example, it is possible for a LUN exported from a RAID card on a misbehaving node to be moved to a RAID card on the healthy node by reconfiguring the switch on the surviving node. Accordingly, fail-over for RAID cards, expanders, and other hardware elements are made possible through reconfiguration scenarios via the SAS switches.

As shown, the exported storage units (Target A 511, Target B 512) may be mapped to volumes represented by logical disks (e.g., logical disks 521, 522, 523 in FIG. 5A and 561, 562, 563 in FIG. 5B). The logical disks are provided to the target resource to become the exported target. The logical disks are supported by a mapping between physical disks and a subset of a RAID controller's output ports. As previously referenced, the SAS-based interconnect can allow for the creation of RAID-based LUNs that can persist or be moved to different nodes (e.g., extending storage of the LUNs across node 1 501 and node 2 502). To support these logical disks, a set of virtual host bus adapters, vHBAs (provided from vHBA mappings 543, 544, 545 in FIG. 5A and vHBA mappings 546, 547, 548 in FIG. 5B) can be created and reconfigured to represent a flexible mapping between controllers, switches, and disks. Thus, the vHBAs serve as a resource abstraction that is particular to the switch utility, and are used to track the footprint of a logical disk as it is mapped to a particular RAID card.

With the use and reconfiguration of SAS switches 541, 542, fail-over behavior can be far more nuanced and robust than the nominal recovery to a node loss that would occur with typical HA resource monitoring. The use of SAS switches 541, 542 enables for full-featured disk sparing and switchable mapping between the disks and controllers of different nodes 501, 502. Further, such dynamic mapping may be extended to enable reconfiguration of the cluster beyond simple failure settings, such as with a reconfiguration of the storage among the nodes to accomplish load balancing among redundant units.

As shown with reference to FIG. 5A, an example is provided where the RAID controller 1 531 has encountered a failure condition. The logical disk 521 that is based on a mapping between the RAID controller 1 531 and disk 1 551, disk 3 553 will accordingly fail. To compensate for this failure, a resource agent (e.g., an OCF resource agent) can be configured to monitor the abstracted representation of the RAID controller resource, and substitute the RAID controller 1 531 hardware resource with the RAID controller 2 hardware resource 532. Each logical disk exported from a RAID controller is backed by disks that may be mapped from different switches. The image of the set of disks that are mapped for a logical disk is represented within the switch as a vHBA resource. (As shown, the vHBA mapping 543 between the switches and RAID controller 1 is replaced with vHBA mapping 545 between the switches and RAID controller 2). If the actions to move the disks from the failed RAID card will involve switches on multiple nodes (e.g., involve SAS switch 1 541 and SAS switch 2 542), actions on nodes remote to the failing RAID card have to be undertaken. In such scenarios, the cluster aware RGMANAGER will be involved.

Resources presented at the cluster level (e.g., cluster aware resources) are directly monitored by the resource agent and subject to actions by a service agent, such as RGMANAGER, through start/stop and status actions. These cluster level resources represent the relationship between a RAID card and a switch, thus each resource is a switch/ resource pair. For example, if there are four RAID cards each plumbed to two switches, there are eight hybrid or paired resources. Failure of a RAID card would then cause failure events on all hybrid resources that involve that RAID card (e.g., two resources). Failure of a switch would involve all hybrid resources that involve that switch (e.g., four resources).

In the scenario depicted in FIGS. 5A and 5B, the failure of the RAID controller 531 will be experienced at the switch via the switch agent. The switch agent will identify the vHBAs associated with the failed RAID card. The hybrid resources delivering these vHBAs will be identified as well. Each of the vHBAs may be represented as a resource object within the switch resources portion of the cluster.conf file. For the switches that supply disks to a logical disk, there is a vHBA image for the logical disk represented within each switch region in cluster.conf. Upon failure, cluster.conf resource entries for the vHBA runtime mappings are updated to reflect the fail-over target. The agent for the hybrid resources is then signaled.

Since some of the remappings will take place on nodes that are remote with respect to the failing RAID card, the agent event is triggered through the RGMANAGER component. The resource failure will be experienced by the agent through an RGMANAGER start/stop action. The agent will become aware of the meaning of this general action when it reads the state of the hybrid resource that it was called with in the cluster.conf file. (The vHBA mappings associated with logical disk 522 for RAID controller 3 remain unchanged). The resource agent may then restart the operation of Target A 511 to now utilize the logical disk 523. Accordingly, all actions for restoration of the resource failure have preserved the original site of target export, therefore there is no node-level fail-over of the exported target (Target A 511).

As shown with reference to FIG. 5B, an example is provided where the RAID controller 1 531 has encountered a failure condition, but where the RAID controller 2 532 is also unavailable for resource substitution. The logical disk 561 (which is based on the vHBA mapping 546 present in the switches that provide mappings for disk 1 551 and disk 3 553) will fail. To compensate for this failure, the resource agent (e.g., the OCF resource agent) can be configured to substitute the RAID controller 1 531 hardware resource with the RAID controller 3 hardware resource 533. (Assume for this example that the RAID controller 532 has also failed or is otherwise unavailable.) This resource failure event can be handled by the resource agent, and followed by resource failover actions to establish the logical disk 563 by identifying and updating the vHBA records on the effected switches to reflect a vHBA mapping 548. The vHBA records track the mapping of disk 1 551 and disk 3 553. (The vHBA mapping 547 with RAID controller 3 remains unchanged, and the RAID controller 3 533 will now include multiple mappings).

After the resource substitution in FIG. 5B, the Target A 511 will not be able to immediately utilize the substituted RAID controller 3 533 that includes the logical disk 563, because the dependent resources now exist on another node. To utilize the substituted RAID controller 3 533, reconfiguration of the storage service 505 is necessary. This is handled in an automated fashion by propagating the resource event up the resource dependency tree, to inform the target that the LUNs dependent on this resource have been altered. As the resource event is propagated up the resource dependency tree, ultimately node level failure of the service will occur, followed by failover of the service to another node (e.g., failover of the service from node 1 501 to node 2 502, as detected and performed by the RGMANAGER component or another cluster service manager). The service failover to node 2 502 will result in the restart of the Target A service on node 2 502, and the resulting use of the vHBA mapping 548 with the RAID controller 533. As a result, the resource failure of the logical unit 561 has been handled with inter-node failover.

The switch to a secondary RAID controller may occur either as a result of a detected failure with the primary RAID controller, or as a result of some detected condition with the primary RAID controller. For example, excessive or unbalanced traffic on the RAID controller that is detected by a resource agent may suggest the need to distribute disks among other less-used RAID controllers. Accordingly, the mechanisms described for resource element substitution may be extended beyond detected device failure scenarios, and may allow substitution, replacement, and distribution of resource elements through the use of abstracted resources.

As illustrated above, the dependency tree for the abstracted resources are associated with complex relationships among redundant hardware on a single node. The definition of the dependency tree can customize failover characteristics for a resource target on a node. Only if no resource is substitutable from a node, or a decision is made to select a resource from another node, does the failure rise to the level of the service. Further, use of the dependency trees allows each of the abstracted resources to be backed by its own collection of hardware or virtual resources of its own, allowing lower-level resources to experience failover in a similar fashion to existing services.

With use of the dependency tree and resource reconfiguration in high availability services, continued access to storage targets may be provided even when a low-level storage resource in the node fails. This may be experienced as the loss of a RAID card or switch. The exported target service continues based on a direct fail-over to a second RAID card on the same node or a degraded LUN that must execute its storage requests on a degraded logical disk. For the storage targets originally exported by a failing controller in an intra-node resource element failover, reconfiguration of the storage unit to map any surviving media to RAID cards on a surviving node allows the surviving controller to become the origin of all of the targets originally exported by the failed controller. Target service for all of the migrated LUNs may not be uninterrupted but it will restart within a very short time. The information that is needed to provide the resource substitution and service failover for a resource may be communicated among a plurality of nodes in the cluster. In some examples, the use of a cluster configuration object (e.g., cluster.conf) may be used to define failover resources, capabilities, and resource state for the abstracted resources and the associated reconfigurable resources operating in the cluster. Making this information accessible in the cluster configuration object can present the abstracted resources at the cluster-level, for cluster-aware processes and monitoring, and provides the benefit of interchangeability among substitutable resource elements that may exist across the cluster. Thus, a definition of one or more of the abstracted resources in a cluster configuration enables cluster-aware resource changes to occur, even for lower level hardware resource abstractions. This further enables the possibility that any abstracted resource can be cluster-aware, through the propagation of the cluster configuration object and service monitoring (such as RGMANGER) for runtime conditions.

FIG. 6 illustrates an example format and data fields of a cluster configuration object 600, cluster.conf, used for resource monitoring and failover specifications for a storage service according to an example. The illustrated fields provide sample data relating to the configuration of resources deployed in a storage service, from the SAS-based storage dependencies provided for the storage service configuration depicted in FIGS. 3, 4, 5A, and 5B.

In addition to other information maintained in the cluster configuration object, two additional sections are provided: a resource definition section 610, and a runtime configuration definition 620. The resource definition section 610 includes data values used to define and implement resource abstractions in a resource of the resource hierarchy as described herein. The runtime configuration definition 620 provides data values used to track and maintain the real-time state of a configurable resource, such as a SAS switch, which provides a flexible mapping to a variety of physical resources.

The resource definition section 610 includes data values 611 for <spd_switch>resources, an XML node representing values for a switch. The data values 611 may be used by RGMANAGER, for example, to track the instances and identifiers of the switches (and to identify the specific health or status of an individual switch in a cluster).

The resource definition section 610 further includes data values 612 for <spd_switch_vhba>resources, an XML node representing values for a virtual storage unit, a vHBA, established in a SPD switch configuration (e.g., vHBAs mappings 543, 544, 545, 546, 547, 548 in FIGS. 5A, 5B). The data values 612 map disks (e.g., SSD disks) to a subset of a RAID card's output ports. Each vHBA resource has properties for a set of output ports, a RAID card that is attached to those ports, a list of disks to map, a fail-over RAID card list, the associated switch, and a LUN name. A disk may only be assigned to one RAID card but may be assigned to more than one vHBA as long as the primary RAID card and the fail-over lists for the vHBAs match. A disk will be part of more than one vHBA if the disk's partitioned storage is present in more than one LUN.

The data values 612 representing the vHBA serve as a switch-level embodiment of a LUN, which is abstracted and made aware to the cluster through the cluster configuration object 600. The data values 612 representing the vHBA define the relationship between multiple disks and an associated RAID card resource. In this way, each LUN may be mapped, failed over, while allowing quality of service to be managed individually at the switch level. In the data values 612, the disks that form a LUN are expected to be contributed from multiple switches from multiple nodes. An individual vHBA record in the data values 612, however, only records the contributed disks from a single particular switch. To reflect the LUN relationship, the LUN field is used as a record name. A record is then included in the runtime fields 620 (the RT_switch portion) of the cluster configuration object 600, listing the list of vHBAs from various switches that can be matched to determine the set of disks for a LUN that is constructed on a RAID card.

The runtime fields 620 in the configuration file accordingly represent the runtime instantiations of configurable devices (specifically for the configuration of a switch, mapping RAID cards RC1, RC2, RC3, RC4, with data values 622, 622, 623, 624 to runtime mappings of the RAID cards to respective switches). The runtime data fields 620 thus represent the choice among the configuration options for the reconfigurable resources, and can represent a configuration state that may occur after a failover. It will be understood that runtime configurations for other devices and resources may also be provided within the cluster configuration object 600 for other reconfigurable resources.

Figure 7:
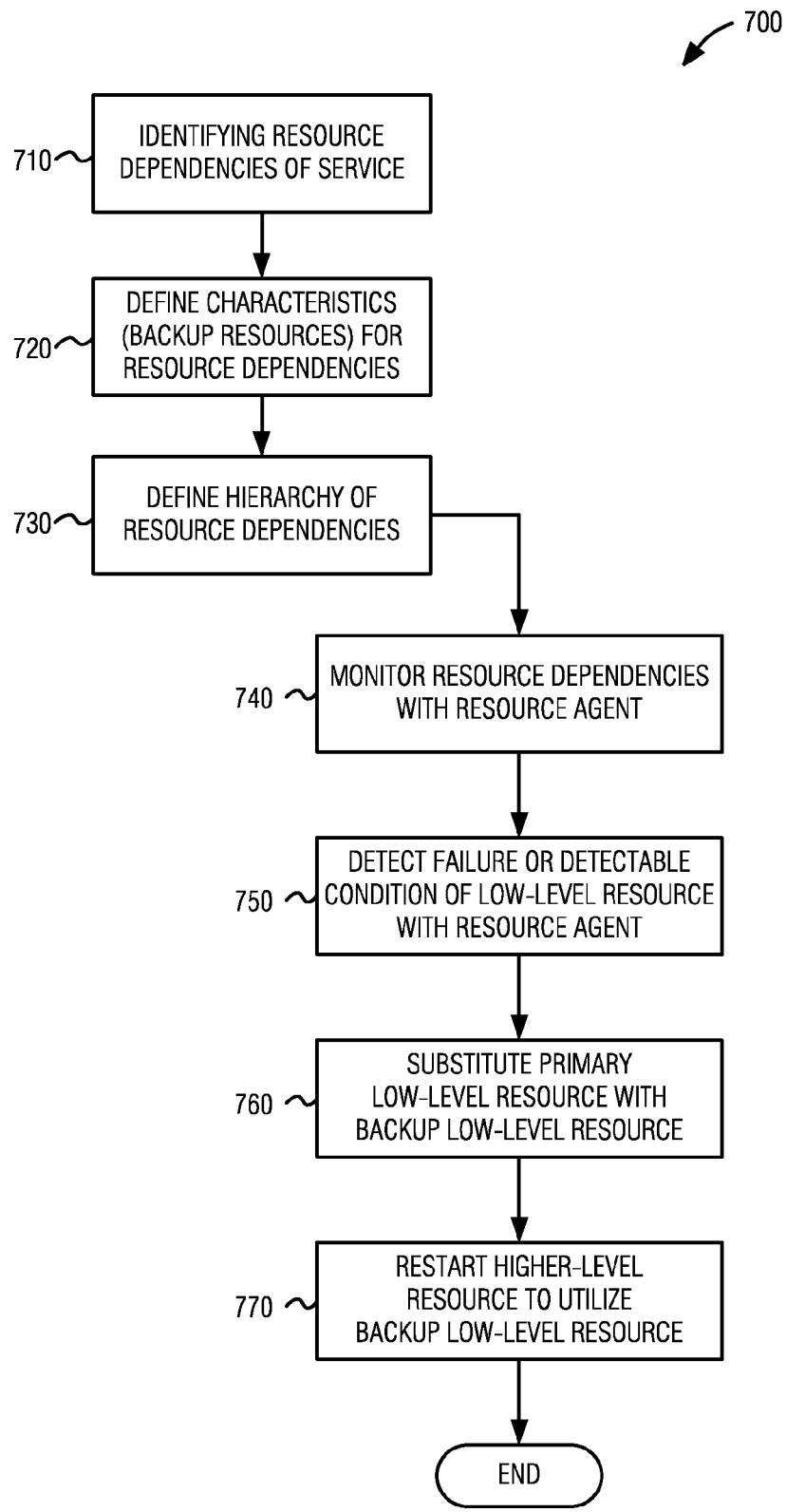
FIG. 7 is flowchart that illustrates a method of managing a resource failure in a cluster computing system according to an example.
Figure 8:
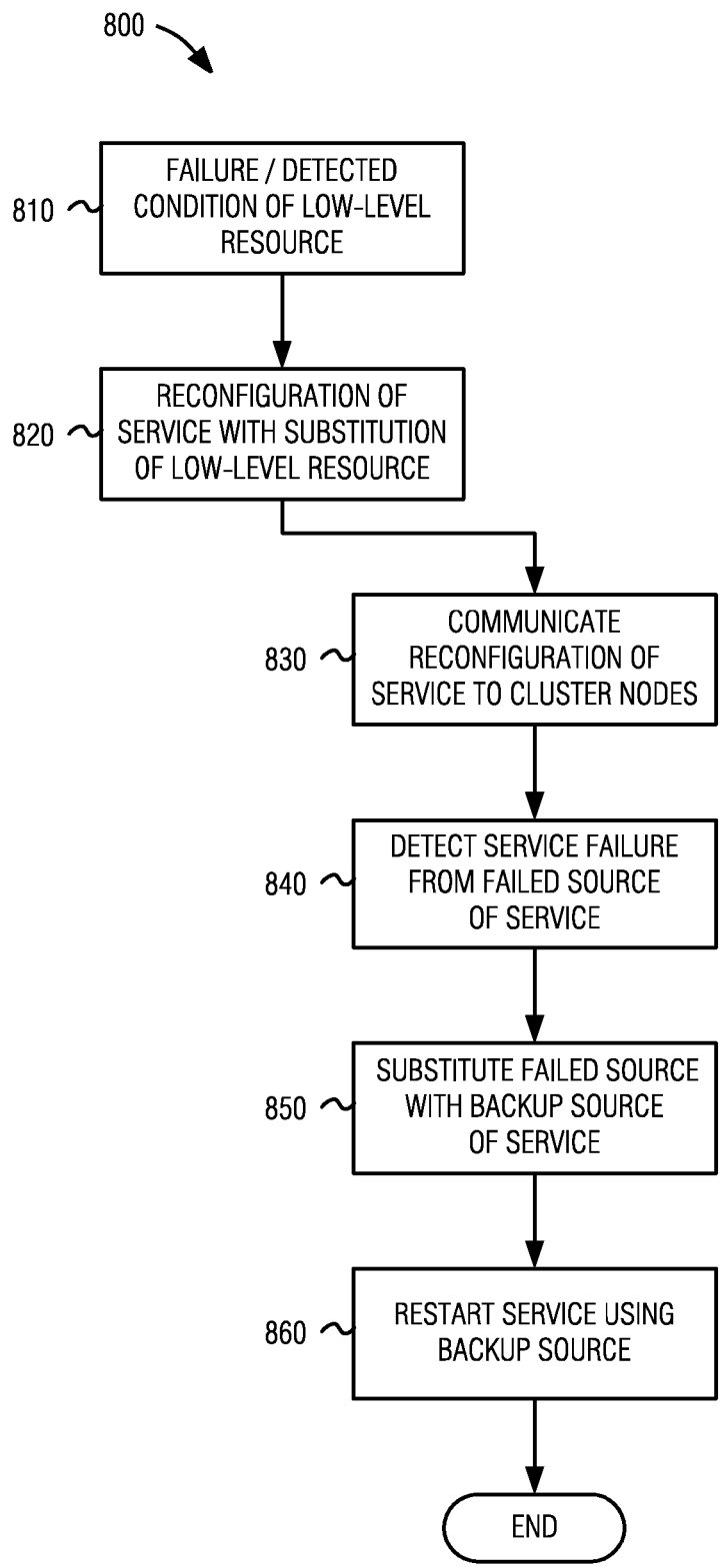
FIG. 8 is flowchart that illustrates a method of managing a service failure in a cluster computing system according to an example.

FIGS. 7 and 8 depict flowcharts 700, 800 of methods for implementing a resource abstraction in a cluster system according to one example. The operations for planning and managing service fail-over in the presence of a resource fault can be classified into three general categories: identifying the resource to be used in a service and its back-up (operations 710, 720, 730, further described below); monitoring the selected resource (operations 740, 750, 760, 770, further described below); and reconfiguring the service to use the back-up resource when a fault in the primary resource is detected (operations 830, 840, 850, 860, further described below).

In FIG. 7, the flowchart 700 for a method of managing a resource failure in a cluster computing system operates to create the resource abstraction based on resource dependencies. These operations include steps to identify resource dependencies of a particular service (operation 710), define the characteristics, including the backup resources, for the resource dependencies of the particular service (operation 720), and define a hierarchy of the resource dependencies from the particular service (operation 730). These operations may be performed during a configuration/reconfiguration stage, and it will be understood that the identified hierarchy of resource dependencies may be persisted (or imported) for continual or repeated use by a cluster monitoring system.

The flowchart 700 continues with operations to monitor the selected resource, including steps to monitor the particular resource dependencies of the hierarchy, with monitoring operations performed by a resource agent (operation 740). From this monitoring, failure or other conditions of the resource may be detected with the resource operations of the resource agent, and this resource agent may respond to the failure or other conditions of the resource with generation of a resource event (operation 750). The resource agent thus may operate to detect a resource event and perform defined resource handling (and fail-over) operations, such as substituting a resource element (e.g., a primary low-level resource) with another resource element (e.g., a backup low-level resource) (operation 760).

As a result of the resource substitution at lower levels of the resource hierarchy, further reconfiguration is accomplished at higher levels of the resource hierarchy, which may include restarting the higher-level resource to utilize the substitute resource element (e.g., to utilize the backup low-level resource) (operation 770). In cases where the substitution does not raise or effect a failure to the highest levels of the resource hierarchy (and does not affect the service), the restarting of the higher-level resource will allow the continuation of the resource operation. Thus, the service operations that are dependent on the hierarchy of resource dependencies can continue as a result of restarting the higher-level resource.

In FIG. 8, the flowchart 800 for a method of managing a service failure in a cluster computing system, further handles the case where the detected failure or condition of a low-level resource (operation 810) results in a service failure. Thus, the operations previously described for FIG. 7 may operate to reconfigure the resource, but further configuration of the service may be needed to utilize the resource. The service modification is initiated through the reconfiguration of the service by the substitution of the low-level resource (operation 820), and subsequent events to raise the resource event and reconfiguration of the resource to the service level. This may include, for example, the reconfiguration of a particular service to specify migration to another node of the cluster.

Subsequent operations to reconfigure and restart the service include steps to communicate the reconfiguration of the service to the cluster nodes (operation 830). For example, this may include effecting configuration information to one or more other cluster nodes, with use of a cluster configuration object (e.g., cluster.conf). The service-level monitors may further detect the service failure from the failed source of the service (operation 840), such as failure of a service at a particular node. This may also include the substitution of a failed source with a backup source of the service (operation 850) to result in fail-over to another cluster node; and finally restarting the service at the backup source (operation 860), to utilize the configuration of the new node.

Figure 9:
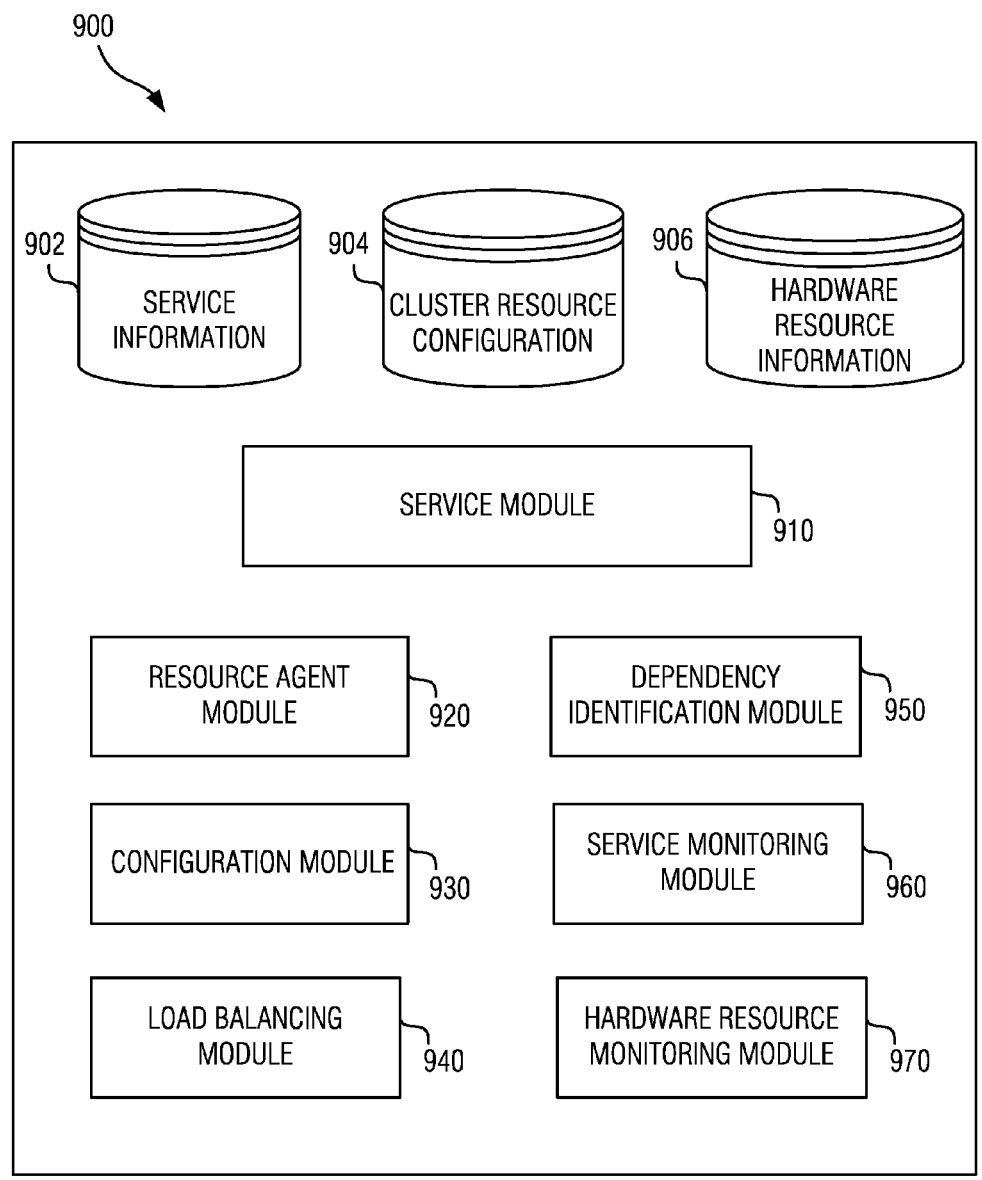
FIG. 9 is a block diagram that illustrates a computer system including components for management of cluster resources according to an example.

FIG. 9 provides an illustration of a system 900 configured for operation of a high availability service and resource dependency hierarchy in a cluster computing system, in connection with a service module 910 that is configured to provide service operations of one or more services. This system 900 may include memory (e.g., an instance of volatile or non-volatile memory, including direct data values or data implemented by a data structure, database, data store, or other data instance) providing instances of service information 902, cluster resource configuration 904, and hardware resource information 906, for further processing and handling of resource and service fail-over and condition processing.

In these memory units, the service information 902 may include a definition in a service information object, with the service information object defining information for the configuration and operation of the service among the first node and the second node. Additionally, the cluster resource configuration 904 may include a definition in a cluster resource configuration object, with the cluster resource configuration object disseminated to the first node and the second node. A definition of the hierarchy of resources and a definition of resource fail-back for the configuration change may be provided in the cluster resource configuration object, which may be disseminated to the first node and the second node. Additionally, the hardware resource information 906 may include a definition in a hardware resource information object, with the hardware resource information object providing information related to configuration and operation of hardware resources such as the first component and the second component.

The system 900 may further include a series of modules used to conduct operations of services in the cluster computing system (including a service implemented by the service module 910 upon a plurality of computing nodes including a first node and a second node, the first node and the second node providing a distributed service in the cluster with use of resources among the first node and the second node). These modules are depicting as including:

A resource agent module 920 configured to monitor an abstracted resource operating at the first node and produce a resource event in response to failure from the abstracted resource. For processing of this abstracted resource, the abstracted resource is a member of a hierarchy of resources, and the distributed service is dependent on the abstracted resource such that failure from the abstracted resource indicated by the hierarchy of resources results in failure of the service;

A configuration module 930 configured to reconfigure the abstracted resource to replace a first component with a second component for operation of the service, wherein the configuration module operates to process the resource event to propagate a configuration change in dependencies of the hierarchy of resources that rely on the abstracted resource;

A load balancing module 940 configured to provide information for reconfiguration for load balancing of utilization of resources among the first node and the second node, based on definitions of dependencies for the resources that rely on the abstracted resource;

A dependency identification module 950 configured to identify and define resource dependencies in the hierarchy of resources that rely on the abstracted resource;

A service monitoring module 960 configured to provide monitoring for a failure of the service, the failure of the service resulting from the failure condition being propagated to the top of the hierarchy of resource dependencies; and A hardware resource module 970 configured for monitoring and configuration of individual hardware resources of the abstracted component (e.g., primary and backup resources).

Additional examples correspond to systems, hardware configurations, and related computer programs that carry out the above-described methods. For example a system may include at least one computer (e.g., as in FIG. 10) to perform software and hardware operations for modules that carry out aspects of the methods 700, 800 of FIGS. 7 and 8, and the various modules of FIG. 9.

Figure 10:
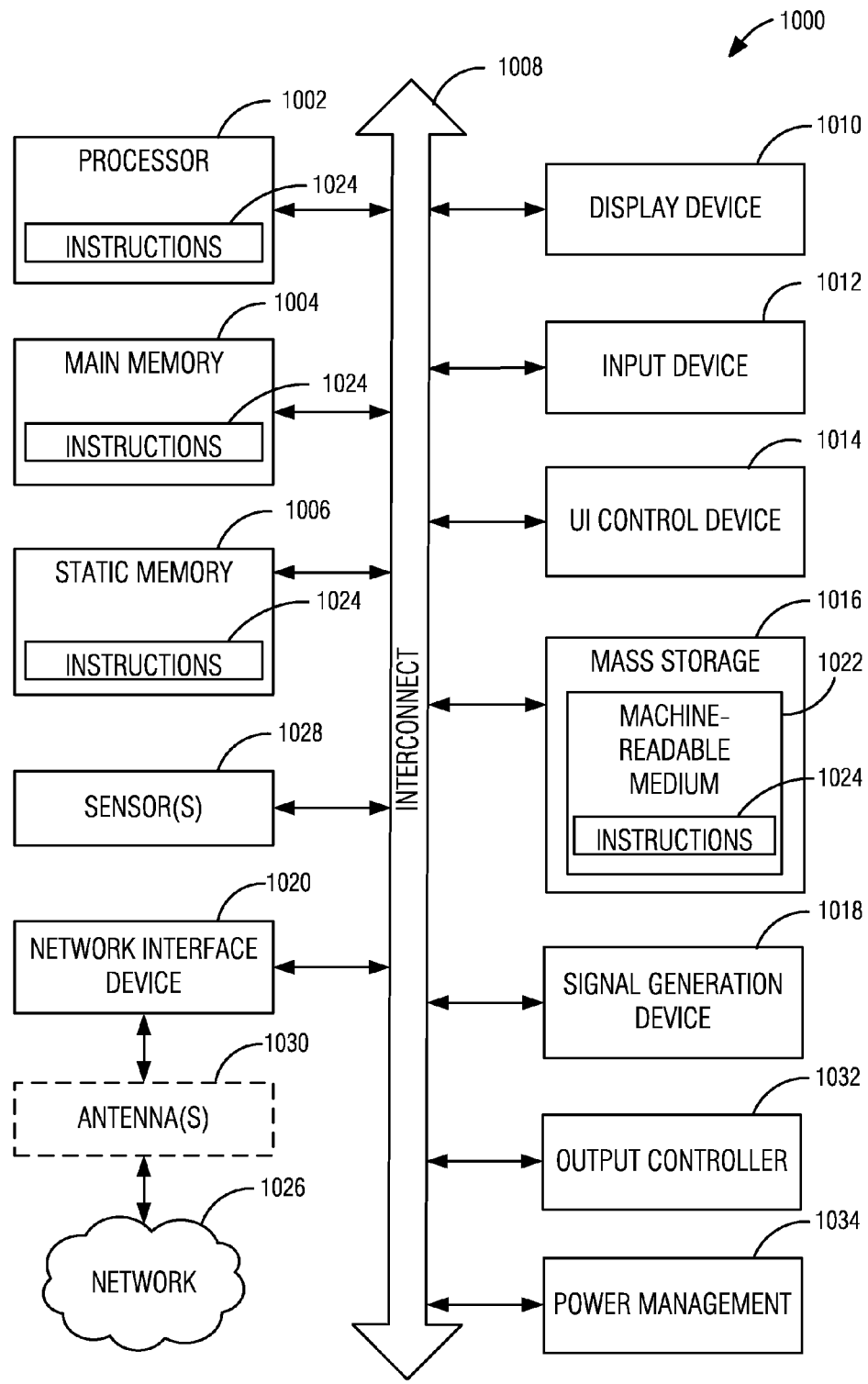
FIG. 10 is a block diagram that illustrates a computer processing system within which a set of instructions for causing the computer to perform any one of the methodologies discussed herein may be executed.

FIG. 10 shows a machine in the example form of a computer system 1000 within which instructions for causing the machine to perform any one or more of the methodologies discussed here may be executed. Computer system 1000 may be embodied as a node computing device, providing operations of the cluster computing system described throughout the present disclosure, or any other processing or computing platform or component described or referred to herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004, and a static memory 1006, which communicate with each other via an interconnect 1008 (e.g., a bus or link). The computer system 1000 may further include a video display device 1010 (e.g., a liquid crystal display (LCD) or a cathode ray tube (CRT)). The computer system 1000 may also include an alphanumeric input device 1012 (e.g., a keyboard), a user interface (UI) control device 1014 (e.g., a mouse), a mass storage unit 1016 (e.g., a disk drive), a signal generation device 1018 (e.g., a speaker), an output controller 1032, a power management controller 1034, a network interface device 1020 (which may in some examples include or operably communicate with one or more antennas 1030, transceivers, or other wireless communications hardware), and one or more sensors 1028 which provide sensor data for hardware, software, or external conditions in the computer system 1000.

In some contexts, a computer-readable medium may be described as a machine-readable medium. The disk drive unit 1016 includes a machine-readable medium 1022 on which is stored one or more sets of data structures and instructions 1024 (e.g., software) embodying or utilizing any one or more of the methodologies or functions described herein. The instructions 1024 may also reside, completely or at least partially, within the static memory 1006, within the main memory 1004, or within the processor 1002 during execution thereof by the computer system 1000, with the static memory 1006, the main memory 1004, and the processor 1002 also constituting machine-readable media.

While the machine-readable medium 1022 is suggested in some examples to be a single medium, the terms "machine-readable medium" and "computer-readable medium" may each refer to a single medium or multiple media (e.g., a centralized or distributed database, and/or associated caches and servers) that store the one or more sets of data structures and instructions 1024. These terms shall also be taken to include any tangible or non-transitory medium that is capable of storing, encoding or carrying instructions for execution by the machine and that cause the machine to perform any one or more of the methodologies disclosed herein, or that is capable of storing, encoding or carrying data structures utilized by or associated with such instructions. These terms shall accordingly be taken to include, but not be limited to, solid-state memories, optical media, and magnetic media. Specific examples of machine-readable or computer-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; compact disc read-only memory (CD-ROM) and digital versatile disc read-only memory (DVD-ROM).

The instructions 1024 may further be transmitted or received over a communications network 1026 using a transmission medium. The instructions 1024 may also be transmitted using the network interface device 1020 and any one of a number of well-known transfer protocols (e.g., hypertext transfer protocol (HTTP)). Examples of communication networks include a local area network (LAN), a wide area network (WAN), the Internet, mobile telephone networks, plain old telephone (POTS) networks, and wireless data networks (e.g., IEEE 802.11, Wi-Fi, Long Term Evolution (LTE) or WiMax networks). The term "transmission medium" shall be taken to include any intangible medium that is capable of storing, encoding or carrying instructions for execution by the machine, and includes digital or analog communications signals or other intangible media to facilitate communication of such software.

Certain embodiments are described herein as including logic or a number of components, modules, or mechanisms. Modules may constitute either software modules or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module (e.g., a computer-implemented module) may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" (e.g., a "computer-implemented module") should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices and may operate on an information resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Although only certain embodiments have been described in detail above, those skilled in the art will readily appreciate that many modifications are possible without materially departing from the novel teachings of this disclosure. For example, aspects of embodiments disclosed above can be combined in other combinations to form additional embodiments. Accordingly, all such modifications are intended to be included within the scope of this disclosure.

What is claimed is:

1. A method for failover of cluster computing system resources, operable in a cluster computing system including a plurality of cluster nodes, the method comprising operations performed by a processor of the cluster computing system, and the operations including:

monitoring a lower-level abstracted resource with a resource agent to detect a failure condition indicated by the lower-level abstracted resource, the lower-level abstracted resource used by a first node of the plurality of cluster nodes in a service offered by the cluster computing system;

reconfiguring the lower-level abstracted resource with the resource agent, in response to detection of the failure condition indicated by the lower-level abstracted resource, the resource agent operating to substitute a primary component of the lower-level abstracted resource with a backup component of the lower-level abstracted resource; and reconfiguring a higher-level abstracted resource with the resource agent by performing a resource event, wherein the resource event causes a rediscovery of a resource mapping in the cluster computing system for the higher-level abstracted resource, and wherein the higher-level abstracted resource is dependent on the lower-level abstracted resource;

wherein the lower-level abstracted resource and the higher-level abstracted resource are members of a hierarchy of resource dependencies, and wherein the service is dependent on the hierarchy of resource dependencies such that a failure condition propagated to a top of the hierarchy of resource dependencies results in failure of the service.

2. The method of claim 1, wherein the resource agent operates to reconfigure the higher-level abstracted resource by performing the resource event to further cause the restart of the higher-level abstracted resource, to prevent failure of the higher-level abstracted resource and fail-over of the service from the first node to a second node of the plurality of cluster nodes.

3. The method of claim 1, wherein the higher-level abstracted resource is located at the top of the hierarchy of resource dependencies, wherein the service is directly dependent on the higher-level abstracted resource, such that failure of the higher-level abstracted resource results in the failure of the service.

4. The method of claim 1, comprising:
monitoring the service to detect failure of the service, the failure of the service resulting from the failure condition being propagated to the top of the hierarchy of resource dependencies; and
performing a fail-over of the service from the first node to a second node of the plurality of cluster nodes, in response to the failure condition and substitution of the primary component of the lower-level abstracted resource with the backup component of the lower-level abstracted resource;
wherein the first node provides the primary component of the lower-level abstracted resource, and wherein the second node provides the backup component of the lower-level abstracted resource.

5. The method of claim 4, comprising:
communicating a cluster configuration object among the plurality of cluster nodes to effect the reconfiguring of the lower-level abstracted resource and the higher-level abstracted resource,
wherein a definition of the primary component or the backup component for operation of the lower-level abstracted resource is provided in the cluster configuration object; and
wherein the hierarchy of resource dependencies used in the service is defined in the cluster configuration object.

6. The method of claim 4, wherein a cluster manager is used to detect the failure of the service, and wherein, responsive to the fail-over of the service to the second node, the service is configured to commence use of the lower-level abstracted resource at the second node.

7. The method of claim 1, comprising:
identifying the hierarchy of resource dependencies used in the service, the hierarchy of resource dependencies defining dependencies of the service upon resources at a plurality of defined levels of resources, a first of the plurality of defined levels of resources including the lower-level abstracted resource, and a second of the plurality of defined levels of resources including the higher-level abstracted resource.

8. The method of claim 1, wherein the resource agent is a high availability (HA) open cluster framework (OCF) resource agent, the resource agent configured to provide actions upon the lower-level abstracted resource and the higher-level abstracted resource, including start, stop, status, monitor, and meta-data actions.

9. The method of claim 1, wherein the primary component and the backup component of the lower-level abstracted resource include substitutable hardware elements connected to the first node, the substitutable hardware elements provided from: a RAID controller, a Serial Attached SCSI (SAS) switch, a storage disk, a graphics processing unit (GPU), a central processing unit (CPU), a network card, or a storage server.

10. The method of claim 1, wherein the service is a storage service used in a distributed storage platform provided by the cluster computing system, wherein the storage service is used to provide a target logical disk within the plurality of cluster nodes, wherein the higher-level abstracted resource represents the target logical disk, and wherein the lower-level abstracted resource is used to provide storage operations with a plurality of disks distributed among the plurality of cluster nodes.

11. The method of claim 10, wherein at least some resources in the hierarchy of resource dependencies are coupled to a storage switch, such that the reconfiguring the lower-level abstracted resource to substitute a primary component of the lower-level abstracted resource with a backup component of the lower-level abstracted resource is effected by mapping the target logical disk to a new location via the storage switch.

12. A non-transitory machine-readable storage medium, including instructions that, when executed by a processor of a cluster computing system that comprises a plurality of cluster nodes, configure the cluster computing system to perform operations that:
detect a condition of an abstracted resource, using a resource agent, the abstracted resource used by a primary node of the plurality of cluster nodes in a service offered by the cluster computing system, wherein the abstracted resource is a resource in a hierarchy of resources, wherein the service is dependent on the resources of the hierarchy of resources such that failure indicated in the hierarchy of resources results in failure of the service;
reconfigure the abstracted resource, using the resource agent, to substitute a primary component of the abstracted resource with a backup component of the abstracted resource; and
perform a resource event, using the resource agent, the resource event effecting a rediscovery of a resource mapping in the cluster computing system for a resource that is dependent on the abstracted resource.

13. The machine-readable storage medium of claim 12, the instructions further configuring the cluster computing system to perform operations that:
reconfigure the abstracted resource with the resource agent, to prevent failover of the service from the primary node to a backup node of the cluster computing system.

14. The machine-readable storage medium of claim 12, the instructions further configuring the cluster computing system to perform operations that:
detect a condition of the service operating at the primary node, using a service agent; and
reconfigure the service, using the service agent, to fail-over the service from the primary node to a backup node;
wherein conditions for the fail-over are defined in a cluster configuration object made available to the primary node and the backup node, wherein the backup node is configured to utilize the backup component of the abstracted resource.

15. The machine-readable storage medium of claim 12, wherein the primary component and the backup component represent hardware resources used in storage, wherein the service is a storage service for establishing distributed storage with a target logical disk, the target logical disk implemented with a RAID array distributed among the plurality of cluster nodes.

16. The machine-readable storage medium of claim 15, wherein the primary component and the backup component of the abstracted resource represent storage resources coupled to a storage switch, such that the operations that reconfigure the abstracted resource to substitute the primary component of the abstracted resource with the backup component of the abstracted resource are effected by mapping the target logical disk to a new location via the storage switch.

17. The machine-readable storage medium of claim 12, wherein the hierarchy of resources includes a higher-level abstracted resource that relies on the abstracted resource at a higher level in the hierarchy of resources, wherein the higher-level abstracted resource is directly dependent on the abstracted resource, and wherein the service is directly dependent on the higher-level abstracted resource, such that a failure condition experienced at the higher-level abstracted resource results in the failure of the service.

18. A cluster computing system, comprising:
   a plurality of computing nodes including a first node and a second node, the first node and the second node configured to provide a distributed service with use of resources among the first node and the second node; and
   processing circuitry and a memory including instructions, wherein the instructions, which when executed by the processing circuitry, perform failover of cluster computing system resources in the plurality of computing nodes based on an execution of software modules embodying the instructions, the software modules including:
      a resource agent module, the resource agent module configured to monitor an abstracted resource operating at the first node and produce a resource event in response to failure from the abstracted resource, wherein the abstracted resource is a member of a hierarchy of resources, wherein the distributed service is dependent on the abstracted resource such that failure from the abstracted resource indicated by the hierarchy of resources results in failure of the distributed service at the first node; and
      a configuration module, the configuration module configured to replace a first component of the abstracted resource with a second component of the abstracted resource for operation of the distributed service, wherein the configuration module operates to process the resource event to propagate a configuration change in dependencies of the hierarchy of resources that rely on the abstracted resource; and
      a dependency identification module, the dependency identification module configured to identify and define resource dependencies in the hierarchy of resources that rely on the abstracted resource.

19. The cluster computing system of claim 18, the software modules further including:
   a load balancing module configured to provide information for reconfiguration for load balancing of utilization of resources among the first node and the second node, based on the resource dependencies in the hierarchy of resources for resources that rely on the abstracted resource.

20. The cluster computing system of claim 18, the software modules further including:
   a service monitoring module, the service monitoring module configured to provide monitoring for a failure of the distributed service at the first node, the failure of the distributed service resulting from a failure condition being propagated to the top of the hierarchy of resources;
   wherein the service monitoring module performs a failover of service operations from the first node to the second node; and
   wherein the first node provides the first component and wherein the second node provides the second component for operation of the distributed service.

21. The cluster computing system of claim 18, wherein the memory further includes definition of a cluster resource configuration object, wherein the cluster resource configuration object is distributed among the first node and the second node, and wherein a definition of the hierarchy of resources and a definition of resource fail-back for the configuration change is provided in the cluster resource configuration object disseminated among the first node and the second node.

22. The cluster computing system of claim 18, wherein the memory further includes definition of a service information object, wherein the service information object defines information for configuration and operation of the distributed service among the first node and the second node, wherein the memory further includes definition of a hardware resource information object, wherein the hardware resource information object provides information related to configuration and operation of hardware resources, and wherein the hardware resources include the first component and the second component.

\* \* \* \* \*